(12) United States Patent
Miller et al.

(10) Patent No.: US 10,347,923 B2
(45) Date of Patent: Jul. 9, 2019

(54) FUEL CELL SYSTEMS AND COOLING METHODS

(71) Applicant: Teledyne Energy Systems, Inc., Hunt Valley, MD (US)

(72) Inventors: Michael Miller, Sykesville, MD (US); Patrick Scott Ferguson, Baltimore, MD (US); Robert Christopher Utz, Phoenix, MD (US); Robert K. Wynne, New Freedom, PA (US)

(73) Assignee: TELEDYNE ENERGY SYSTEMS, INC., Thousand Oaks, CA (US)

( * ) Notice: Subject to any disclaimer, the term of this patent is extended or adjusted under 35 U.S.C. 154(b) by 489 days.

(21) Appl. No.: 15/061,634

(22) Filed: Mar. 4, 2016

(65) Prior Publication Data

US 2017/0256804 A1    Sep. 7, 2017

(51) Int. Cl.
*H01M 8/04007* (2016.01)
*H01M 8/04082* (2016.01)
*H01M 8/04746* (2016.01)
*H01M 8/04029* (2016.01)
*H01M 8/0432* (2016.01)

(52) U.S. Cl.
CPC ... *H01M 8/04067* (2013.01); *H01M 8/04029* (2013.01); *H01M 8/0432* (2013.01); *H01M 8/04208* (2013.01); *H01M 8/04753* (2013.01)

(58) Field of Classification Search
CPC ......... H01M 8/04029; H01M 8/04067; H01M 8/04208; H01M 8/0432; H01M 8/04753
See application file for complete search history.

(56) References Cited

U.S. PATENT DOCUMENTS

| | | | |
|---|---|---|---|
| 2007/0026268 A1* | 2/2007 | Metzler | H01M 8/04029 244/53 R |
| 2010/0248047 A1* | 9/2010 | Ishikawa | H01M 8/04007 429/423 |
| 2010/0269487 A1* | 10/2010 | Grayson | B64G 1/401 60/240 |
| 2013/0068973 A1* | 3/2013 | van Ruth | F03G 7/06 251/11 |
| 2015/0337763 A1* | 11/2015 | Vuillamy | F02K 9/46 60/221 |

OTHER PUBLICATIONS

F. Barbir, *PEM Fuel Cells: Theory and Practice*, Elsevier, 2013.

* cited by examiner

*Primary Examiner* — Osei K Amponsah
(74) *Attorney, Agent, or Firm* — K&L Gates LLP (57) ABSTRACT

A fuel cell system is disclosed in which a fuel or oxidant fluid is used as a coolant fluid that functions as a heat sink a fuel cell.

24 Claims, 8 Drawing Sheets

FUEL CELL SYSTEMS AND COOLING METHODS

TECHNICAL FIELD

This specification generally relates to fuel cell technology and more particularly to systems and methods for cooling fuel cells.

BACKGROUND

The information described in this background section is not admitted to be prior art.

Fuel cells generally operate by exothermically reacting a fuel and an oxidant to produce electricity, heat, and chemical reaction products. For example, fuel cells utilizing molecular hydrogen ($H_2$) fuel and molecular oxygen ($O_2$) as an oxidant generate electricity, heat, and water. Fuel cells are typically designed to operate within a specified temperature window and, therefore, the heat produced during the reactions must be removed from the fuel cell equipment to maintain thermal control. In some implementations, the heat may simply dissipate to the surrounding environment through conductive, convective, and/or radiative cooling. However, in environments where conductive, convective, and/or radiative cooling is insufficient to maintain temperature control, the fuel cell equipment may need to be cooled using a dedicated coolant loop.

SUMMARY

This specification describes fuel cell systems and methods for cooling fuel cells.

In one example, a fuel cell system comprises a fuel cell, a fuel supply in fluid communication with the fuel cell through a fuel supply line, an oxidant supply in fluid communication with the fuel cell through an oxidant supply line, and a primary coolant loop in fluid communication with the fuel cell and configured to circulate a coolant fluid through the fuel cell. The fuel cell system also comprises a secondary coolant heat exchanger. The coolant loop and a fuel bypass line in fluid communication with the fuel supply pass through the secondary coolant heat exchanger in which heat transfers from the coolant fluid in the coolant primary loop to fuel fluid in the fuel bypass line. A control valve is located in the fuel bypass line upstream from the secondary coolant heat exchanger, and a thermal actuator is located in the primary coolant loop. The thermal actuator and the control valve control the flow of fuel through the secondary coolant heat exchanger based on the temperature of the coolant fluid in contact with the thermal actuator.

In another example, a fuel cell system comprises a fuel cell, a fuel supply in fluid communication with the fuel cell through a fuel supply line, an oxidant supply in fluid communication with the fuel cell through an oxidant supply line, and a primary coolant loop in fluid communication with the fuel cell and configured to circulate a coolant fluid through the fuel cell. The primary coolant loop and the fuel supply line pass through a fuel supply line heat exchanger in which heat transfers from the coolant fluid in the primary coolant loop to fuel fluid in the fuel supply line. Alternatively, or in addition, the primary coolant loop and the oxidant supply line pass through an oxidant supply line heat exchanger in which heat transfers from the coolant fluid in the primary coolant loop to oxidant fluid in the oxidant supply line.

In another example, a fuel cell system comprises a fuel cell, a fuel supply in fluid communication with the fuel cell through a fuel supply line, an oxidant supply in fluid communication with the fuel cell through an oxidant supply line, and a primary coolant loop in fluid communication with the fuel cell and configured to circulate a coolant fluid through the fuel cell. The fuel cell system also comprises a secondary coolant heat exchanger. The primary coolant loop and a fuel bypass line pass through the secondary coolant heat exchanger in which heat transfers from the coolant fluid in the primary coolant loop to fuel fluid in the fuel bypass line. The secondary coolant heat exchanger is in fluid communication with the fuel supply through the fuel bypass line. A control valve is located in the fuel bypass line upstream from the secondary coolant heat exchanger, and a thermal actuator is located in the primary coolant loop. The thermal actuator and the control valve control the flow of fuel through the secondary coolant heat exchanger based on the temperature of the coolant fluid in contact with the thermal actuator. The fuel cell system may also comprise a fuel supply line heat exchanger or an oxidant supply line heat exchanger. The primary coolant loop and the fuel supply line pass through the fuel supply line heat exchanger in which heat transfers from the coolant fluid in the primary coolant loop to fuel fluid in the fuel supply line. The primary coolant loop and the oxidant supply line pass through the oxidant supply line heat exchanger in which heat transfers from the coolant fluid in the primary coolant loop to oxidant fluid in the oxidant supply line.

In another example, a fuel cell system comprises a fuel cell, a fuel supply in fluid communication with the fuel cell through a fuel supply line, an oxidant supply in fluid communication with the fuel cell through an oxidant supply line, a fuel bypass line in fluid communication with the fuel supply and the fuel cell, a control valve located in the fuel bypass line, and a sensor in thermal contact with the fuel cell. The sensor and the control valve control the flow of fuel through the fuel bypass line based on the operating temperature of the fuel cell.

It is understood that the invention(s) described in this specification are not necessarily limited to the example embodiments summarized in this Summary.

BRIEF DESCRIPTION OF THE DRAWINGS

Various features and characteristics of the invention(s) described in this specification may be more thoroughly understood by reference to the accompanying figures, in which.

The reader will appreciate the foregoing features and characteristics, as well as others, upon considering the following detailed description of the invention according to this specification.

DETAILED DESCRIPTION

This specification is generally directed to fuel cell systems and cooling methods. The fuel cell systems comprise various components including fuel cells, reactant supply lines, coolant loops, and heat exchangers. The fuel cells are not necessarily limited and may comprise, for example, a polymer electrolyte membrane fuel cell, a solid oxide fuel cell, a direct methanol fuel cell, an alkaline fuel cell, a phosphoric acid fuel cell, a molten carbonate fuel cell, or other types of fuel cells. The construction and operation of fuel cells generally, and polymer electrolyte membrane (PEM) fuel cells specifically, is described, for example, in F. Barbir, *PEM Fuel Cells: Theory and Practice*, Elsevier, 2013, which is incorporated by reference into this specification.

Generally speaking, fuel cells are electrochemical devices that produce electricity through an exothermic oxidation/reduction chemical reaction. In general, two reactants, for example, molecular hydrogen and molecular oxygen, are exothermically reacted within a fuel cell to produce electricity, heat, and reaction products such water in the case of hydrogen/oxygen-based fuel cells. A single fuel cell comprises an anode, a cathode, and an electrolyte located between the anode and the cathode. In hydrogen/oxygen-based fuel cells, for example, at the anode, hydrogen reacts with a catalyst, which produces positively charged hydrogen ions and negatively charged electrons. The hydrogen ions transport from the anode, through the electrolyte, and to the cathode, while the electrons produce an electrical current that passes through an external circuit connecting the anode and the cathode. At the cathode, oxygen reacts with the hydrogen ions and the electrons producing water and heat. In some fuel cell systems, the heat must be transported out of the system and ultimately dissipated to maintain thermal control of the system and to ensure that the fuel cell operates within a designed temperature window. Heat from the fuel cell can be transferred through various heat transfer means, such as radiation, convection, and conduction.

In some fuel cell systems, the waste heat generated by the fuel cell can be dissipated to the atmosphere under ambient conditions. However, in certain environments, for example, with fuel cells operating under vacuum, in space, and/or in underwater environments, heat transfer to the surrounding environment may not be sufficient and additional cooling mechanisms may be required. Where the surrounding environment provides insufficient means of ambient heat transfer, additional mechanisms, for example, coolant loops, can be used for thermal control to maintain power delivery, reaction efficiency, and prevent undesirable thermal damage to the fuel cell. The embodiments described in this specification provide fuel cell systems and cooling methods which facilitate the effective removal of excess thermal energy from fuel cells.

In one example, cryogenic fuel fluids and/or cryogenic oxidant fluids are used as a secondary coolant fluid to absorb heat from a primary coolant fluid in thermal contact with an operating fuel cell. The fuel and/or oxidant fluids may absorb heat from the primary coolant fluid before the fuel and oxidant are fed into a fuel cell. Alternatively, or in addition, a fuel bypass line or an oxidant bypass line may transport fuel or oxidant from their respective supplies to a secondary coolant heat exchanger, bypassing the fuel cell, in which heat transfers from the primary coolant fluid in a primary coolant loop to fuel fluid or oxidant fluid in the fuel bypass line or the oxidant bypass line. In this manner, the fuel fluid or the oxidant fluid in the bypass line operates as a secondary coolant fluid that is vented or otherwise processed, but not fed into the fuel cell.

In examples comprising a secondary coolant heat exchanger in fluid communication with a primary coolant loop and a fuel fluid or oxidant fluid bypass line (operating as a secondary coolant line), a control valve may be located in the bypass line upstream from the secondary coolant heat exchanger, and a thermal actuator may be located in the coolant loop downstream from the secondary coolant heat exchanger. The control valve may comprise a cryogenic control valve if, for example, the bypass line is in fluid communication with a cryogenic vessel storing the fuel or oxidant (e.g., cryogenic tanks or other vessels storing liquid molecular hydrogen or liquid molecular oxygen, which boils-off and flows from the supply vessel, through the bypass line and the control valve, and into the secondary coolant heat exchanger). The thermal actuator may comprise a passive thermal actuator that does not utilize sensors and electronic control hardware or software. A passive thermal actuator may comprise a thermo-mechanical actuator that mechanically engages with the control valve and mechanically operates the opening and closing of the valve to control the flow of fuel or oxidant through the bypass line and the secondary coolant heat exchanger based on the temperature of the primary coolant fluid in contact with the thermal actuator in the primary coolant loop thereby controlling the temperature of the operating fuel cell. The use of a passive thermal actuator that directly actuates the valve based on the thermo-mechanical properties of the actuator hardware—as opposed to an active actuator that operates based on temperature sensors, defined set-points, and feedback control logic—facilitates the operation of a fuel cell within a range of temperatures rather than around a fixed operating temperature defined by the control logic set-point.

In operation, when a fuel cell's temperature is within a defined operating window, the control valve in the bypass line upstream from the secondary coolant heat exchanger is closed and secondary coolant fluid (e.g., molecular hydrogen fuel, molecular oxygen oxidant, or other fuel/oxidant) does not flow through the secondary coolant heat exchanger. When the fuel cell's operating temperature increases, the excess heat is absorbed by the primary coolant fluid flowing through the primary coolant loop and the temperature of the primary coolant fluid increases. As the temperature of the primary coolant fluid increases, the passive thermal actuator absorbs some of the excess heat and thermo-mechanically opens the control valve, thereby causing secondary coolant fluid to flow through the secondary coolant heat exchanger. The secondary coolant fluid (e.g., fuel or oxidant from a cryogenic source) flowing through the secondary coolant heat exchanger absorbs the excess heat from the primary coolant fluid flowing through the secondary coolant heat exchanger in a separate path. The transfer of the heat from the primary coolant fluid to the secondary coolant fluid decreases the temperature of the primary coolant fluid, which circulates back to the fuel cell to absorb additional excess heat.

When the operating temperature of the fuel cell decreases back to within specification, the temperature of the primary coolant fluid approaches the same temperature, and the passive thermal actuator cools and thermo-mechanically closes the control valve, thereby decreasing and ultimately stopping the flow of secondary coolant fluid (e.g., fuel or oxidant from a cryogenic source) through the secondary coolant heat exchanger. This cycle of heat flow from the fuel cell, to the circulating primary coolant fluid, to the passive thermal actuator, and from the passive thermal actuator to the circulating primary coolant fluid, controls the thermo-mechanical actuation of the control valve and the flow of secondary coolant through the secondary coolant heat exchanger, which passively maintains the fuel cell within the defined operating temperature window.

In another example, cryogenic fuel fluid or cryogenic oxidant fluid can be used as a primary coolant fluid in thermal contact with an operating fuel cell. The fuel or oxidant fluids may absorb heat directly from the heat exchange equipment (e.g., cooling plates and manifolds) that comprises part of the fuel cell stack. In such examples, a fuel supply is in fluid communication with the fuel cell through a fuel supply line, and an oxidant supply is in fluid communication with the fuel cell through an oxidant supply line. The fuel supply line and the oxidant supply line feed the fuel and oxidant to the portions of the fuel cell where the reactions take place (e.g., gas flow channels adjacent to the electrodes). The fuel supply or the oxidant supply is also in fluid communication with the fuel cell through a separate bypass line. The bypass line feeds fuel or oxidant to the heat exchange equipment that comprises part of the fuel cell stack, where the fuel fluid or oxidant fluid functions as a primary coolant fluid that absorbs heat directly from the fuel cell stack and is subsequently vented or otherwise processed.

In examples comprising a fuel or oxidant bypass line in direct thermal contact with an operating fuel cell, a control valve may be located in the bypass line upstream from the fuel cell, and a sensor may be located in thermal contact with the fuel cell. The control valve may comprise a cryogenic control valve if, for example, the bypass line is in fluid communication with a cryogenic vessel storing the fuel or oxidant (e.g., cryogenic tanks or other vessels storing liquid molecular hydrogen or liquid molecular oxygen, which boils-off and flows from the supply vessel, through the bypass line and the control valve, and into the heat exchange equipment that comprises part of the fuel cell stack). The sensor may comprise a temperature sensor that measures the operating temperature of the fuel cell and sends a temperature signal to a controller (e.g., a feedback controller) that controls the operation of the control valve. Alternatively, the sensor may comprise a passive thermal actuator that does not utilize sensors and electronic control hardware or software. A passive thermal actuator may comprise a thermo-mechanical actuator that mechanically engages with the control valve and mechanically operates the opening and closing of the valve to control the flow of fuel or oxidant through the bypass line and the fuel cell based on the operating temperature of the fuel cell. The use of a passive thermal actuator that directly actuates the control valve based on the thermo-mechanical properties of the actuator hardware—as opposed to an active actuator that operates based on temperature sensors, defined set-points, and feedback control logic—facilitates the operation of a fuel cell within a range of temperatures rather than around a fixed operating temperature defined by the control logic set-point.

In operation, when a fuel cell's temperature is within a defined operating window, the control valve in the bypass line upstream from the fuel cell (e.g., molecular hydrogen fuel, molecular oxygen oxidant, or other fuel/oxidant) does not flow through the heat exchange equipment comprising part of the fuel cell stack (fuel and oxidant are, however, still flowing through the respective supply lines and reacting in the fuel cell). When the fuel cell's operating temperature increases, the passive thermal actuator absorbs some of the excess heat and thermo-mechanically opens the control valve, thereby causing fuel fluid or oxidant fluid to flow through the fuel cell. The fuel or oxidant fluid (e.g., fuel or oxidant from a cryogenic source) now flowing through the heat exchange equipment comprising part of the fuel cell stack absorbs the excess heat, which cools the operating fuel cell.

When the operating temperature of the fuel cell decreases back to within specification, the passive thermal actuator cools and thermo-mechanically closes the control valve, thereby decreasing and ultimately stopping the flow of the fuel or oxidant "coolant" fluid through the heat exchange equipment comprising part of the fuel cell stack. This cycle of heat flow to and from the fuel cell to the passive thermal actuator controls the thermo-mechanical actuation of the control valve and the flow of fuel or oxidant "coolant" fluid through the heat exchange equipment comprising part of the fuel cell stack, which passively maintains the fuel cell within the defined operating temperature window.

Figure 1:
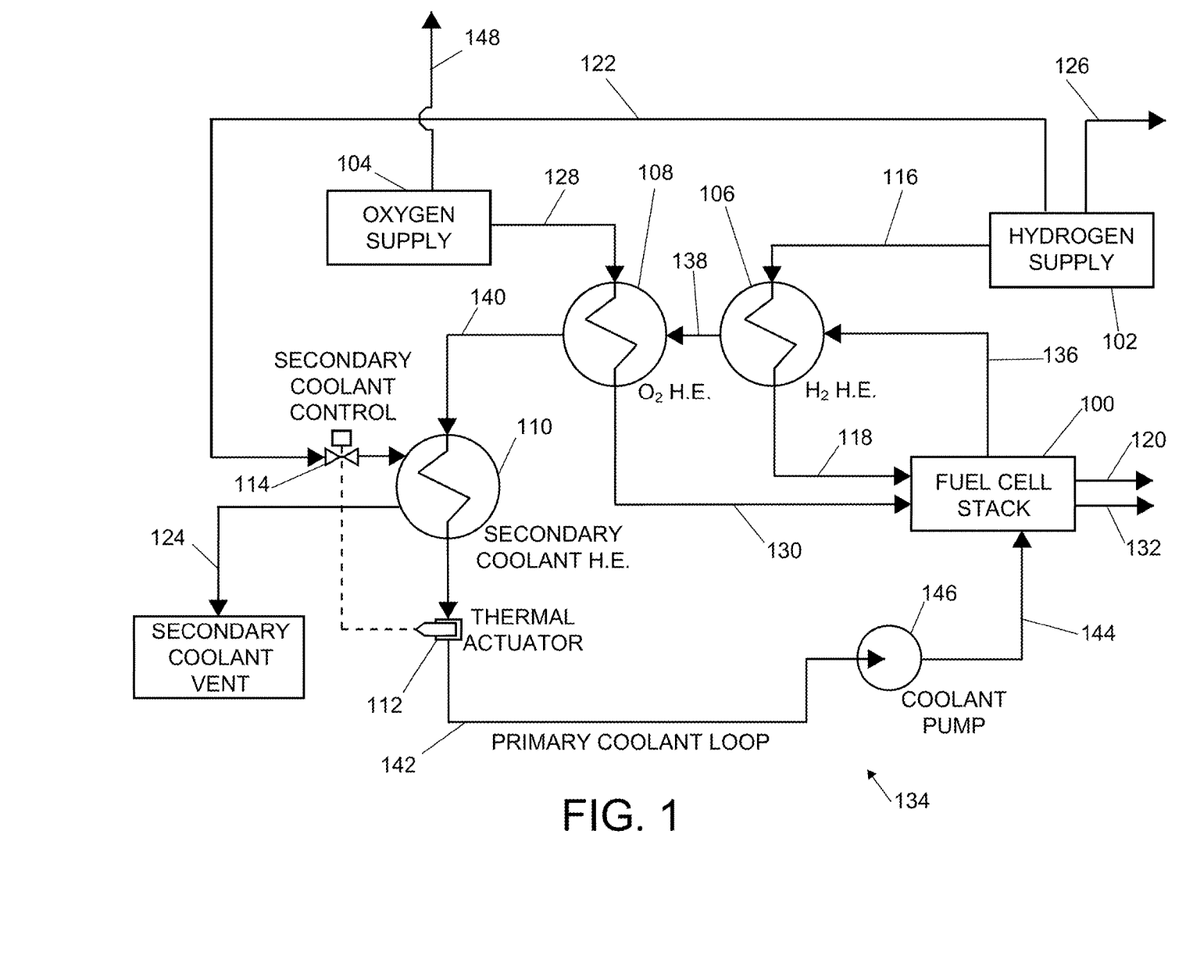
FIG. 1 is a schematic flow diagram illustrating a fuel cell system having three heat exchangers.

Referring to FIG. 1, a fuel cell system comprises a fuel cell stack 100 and a coolant loop 134. The fuel cell stack 100 may comprise a plurality of individual fuel cells and can be configured to provide a specified electrical output, for example, to meet the specific electrical needs of a desired application. The fuel cell stack 100 may be in fluid communication with a hydrogen supply 102 and an oxygen supply 104. The hydrogen supply 102 and the oxygen supply 104 may comprise pressurized tanks that are cryogenically cooled to temperatures below the boiling point of molecular hydrogen gas and molecular oxygen gas (e.g., below about 20 K for hydrogen and about 90 K for oxygen, but generally below 100 K for either). The cryogenic liquids stored in the hydrogen supply 102 and the oxygen supply 104 may boil-off to gaseous hydrogen and oxygen, respectively, which are fed to the fuel cell stack 100 to react and produce electricity, heat, and water. With the cold temperatures of the cryogenically cooled hydrogen supply 102 and the cryogenically cooled oxygen supply 104, the oxygen and hydrogen feeds to the fuel cell stack 100 may be used in heat exchangers to remove thermal energy from the coolant fluid in the coolant loop 134. Another advantage to this embodiment is the hydrogen fuel and oxygen oxidant are heated near to the fuel cell operating temperature thereby conditioning the reactants prior to entering the fuel cell which can improve fuel cell performance.

The fuel cell system further comprises heat exchangers 106, 108, and 110. The heat exchangers may be configured to provide sufficient heat transfer between the various components of the fuel cell system. In one embodiment, the heat exchangers may comprise shell and tube heat exchangers. In another embodiment, the heat exchangers may comprise flat plate heat exchangers.

The cryogenically cooled hydrogen supply 102 may boil-off over time. This boil-off of hydrogen gas could cause the hydrogen supply 102, for example, implemented as cryogenic storage tanks or other vessels, to build excess pressure. To avoid over pressuring the storage tanks, a portion of the hydrogen supply 102 must be vented. The boiled-off hydrogen may be removed from the storage tanks though a hydrogen vent 126 and used as an inlet supply for the fuel cell system through a hydrogen supply line 116. The hydrogen supply 102 may provide fuel to the fuel cell stack 100. The boiled-off hydrogen may exit the hydrogen supply 102 through the hydrogen supply line 116. The hydrogen supply line 116 may pass through a hydrogen heat exchanger 106 and operate as a heat sink to transfer energy from the coolant fluid exiting the fuel cell stack 100. The coolant fluid exits the fuel cell stack 100 through a coolant outlet line 136, which provides the fluid communication between the fuel cell stack 100 and the hydrogen heat exchanger 106. The hydrogen exits the hydrogen heat exchanger 106 and is fed through a hydrogen supply line 118 to the fuel cell stack 100. The unreacted hydrogen exits the fuel cell stack 100 through the hydrogen exit line 120 and is either recycled back into the fuel cell stack 100 (not shown) or vented or otherwise processed.

Similarly, an oxygen supply line 128 transports boiled-off oxygen from the oxygen supply 104 to the oxygen heat exchanger 108, where the oxygen fluid absorbs thermal energy from the coolant fluid in the coolant loop 134. The oxygen supply line 128 provides fluid communication between the oxygen supply 104 and the oxygen heat exchanger 108. In the oxygen heat exchanger 108, the oxygen fluid acts as a heat sink to absorb thermal energy from the coolant fluid. Upon exiting the oxygen heat exchanger 108, the oxygen is fed through the oxygen supply line 130 to the fuel cell stack 100. The unreacted oxygen exits the fuel cell stack 100 through the oxygen exit line 132 and is either recycled back into the fuel cell stack 100 (not shown) or vented or otherwise processed. To avoid over pressuring the storage tanks, a portion of the oxygen supply 104 must be vented. The boiled-off oxygen may be removed from the storage tanks though an oxygen vent 148.

The fuel cell stack 100 generates electricity and heat from the electrochemical reaction between the hydrogen and oxygen feeds. The coolant loop 134 facilitates the removal of the excess heat generated in the exothermic reaction within the fuel cell stack 100. The fuel cell stack 100 is constructed to maintain separation of the coolant fluid from the reactants, products, and electrolyte material in the fuel cell stack. The coolant loop 134 may pass through the fuel cell stack 100 using suitable heat exchange equipment, such as, for example, a manifold or interface heat exchanger that holds cooling plates located adjacent to the electrodes, which transport the excess heat from the electrodes to the coolant fluid circulating through the manifold or interface heat exchanger. In one example, pyrolytic graphite cooling plates (optionally coated with metallic paint, e.g., silver paint) or planar titanium heat pipe cooling plates are located adjacent to the electrodes in a fuel cell stack. The edges of the cooling plates extend beyond the fuel cell stack and are positioned within slots located in a manifold through which the coolant fluid flows. Alternatively, the edges of the coolant plates may be located within slots in an interface plate located between the fuel cell stack and an adjacent interface heat exchanger through which the coolant fluid flows.

Other various types of heat exchangers may be utilized to transport heat from the components of the fuel cell stack 100 to the circulating coolant fluid, for example flat plate heat exchangers. The electrochemical reactions occurring in the operating fuel cell stack 100 also produce water. The produced water may be released from the fuel cell stack 100 and disposed of or collected and contained within a storage tank for various uses.

From the oxygen heat exchanger 108, the coolant fluid enters a line 140 that transports the coolant fluid to a secondary coolant heat exchanger 110. The secondary coolant heat exchanger 110 is in fluid communication with a hydrogen bypass line 122 from the hydrogen supply 102. The hydrogen bypass line 122 feeds a portion of the boiled-off hydrogen to the secondary coolant heat exchanger 110 where is operates as a heat sink. The flow of the hydrogen through the secondary heat exchanger 110 is controlled through a secondary coolant control valve 114 and a thermal actuator 112. The thermal actuator 112 may be placed downstream of the secondary coolant heat exchanger 110. The thermal actuator 112 controls the opening and closing of the secondary coolant control valve 114 based on the temperature of the coolant fluid in the line exiting the secondary coolant heat exchanger 110. In one embodiment, described below in connection with FIGS. 5 and 6, the thermal actuator 112 may comprise a passive thermal actuator in physical contact with the coolant fluid in coolant line 142, in which the passive thermal actuator 112 mechanically operates the secondary coolant control valve 114 based on the temperature of the coolant fluid in the coolant line 142 and actuates the flow of hydrogen into the secondary coolant heat exchanger 110 through the secondary coolant control valve 114. Upon exiting the secondary coolant heat exchanger 110, the hydrogen flows through line 124 and is vented through the hydrogen secondary coolant vent.

In other embodiments, the thermal actuator 112 may be replaced with a temperature sensor and a feedback controller that controls the opening and closing of the secondary coolant control valve 114 to control the temperature of the coolant within the coolant loop. Various types of controllers are envisioned and may be utilized with the fuel cell system.

In addition to the hydrogen bypass line 122 and the hydrogen supply line 116 in fluid communication with the hydrogen supply 102, a primary hydrogen vent line 126 may also be present to vent excess boiled-off hydrogen from the hydrogen supply 102. When the boiled-off hydrogen gas exceeds the requirements for the fuel cell stack 100 and the secondary coolant heat exchanger 110, the hydrogen vent line 126 may permit the release of the excess boiled-off hydrogen to prevent the cryogenically cooled hydrogen supply tank from over pressuring. Although hydrogen lines 116, 122, and 126 are shown as separate outlet lines from the hydrogen supply 102, it is understood that the lines can be implemented as branches from a single outlet line using suitable T-joints or Y-joints in the fluid conduits.

The coolant within the coolant loop 134 may be chosen for its particular heat transfer properties. For example, the coolant may comprise water, ethylene glycol, propylene glycol, methanol, or ethanol, or combinations of any thereof. Other fluids may also be selected for use within the coolant loop 134 having suitable heat transfer properties.

The temperature of the coolant fluid within the coolant loop 134 has its highest temperature exiting the fuel cell stack 100 in the coolant supply line 136 to the hydrogen heat exchanger 106. As the coolant fluid flows through the coolant loop 134, thermal energy in the coolant fluid is transferred through the heat exchangers 106, 108, and 110. When the coolant fluid reaches the coolant fluid inlet line 144 to the fuel cell stack 100, the temperature of the coolant fluid is at its lowest point, which facilitates the removal of the excess thermal energy produced in the fuel cell stack 100. The coolant fluid exits the hydrogen heat exchanger 106 through the coolant line 138 to the oxygen heat exchanger 108. From the oxygen heat exchanger 108, the coolant fluid flows through the coolant line 140 to the secondary coolant heat exchanger 110. From the secondary coolant heat exchanger 110, the coolant fluid enters coolant line 142 that leads to a coolant pump 146, which circulates the coolant fluid within the coolant loop 134. The coolant pump 146 may be powered through gas pressure, electrical power, or other means to facilitate the circulation of the coolant fluid through the coolant loop 134.

Figure 2:
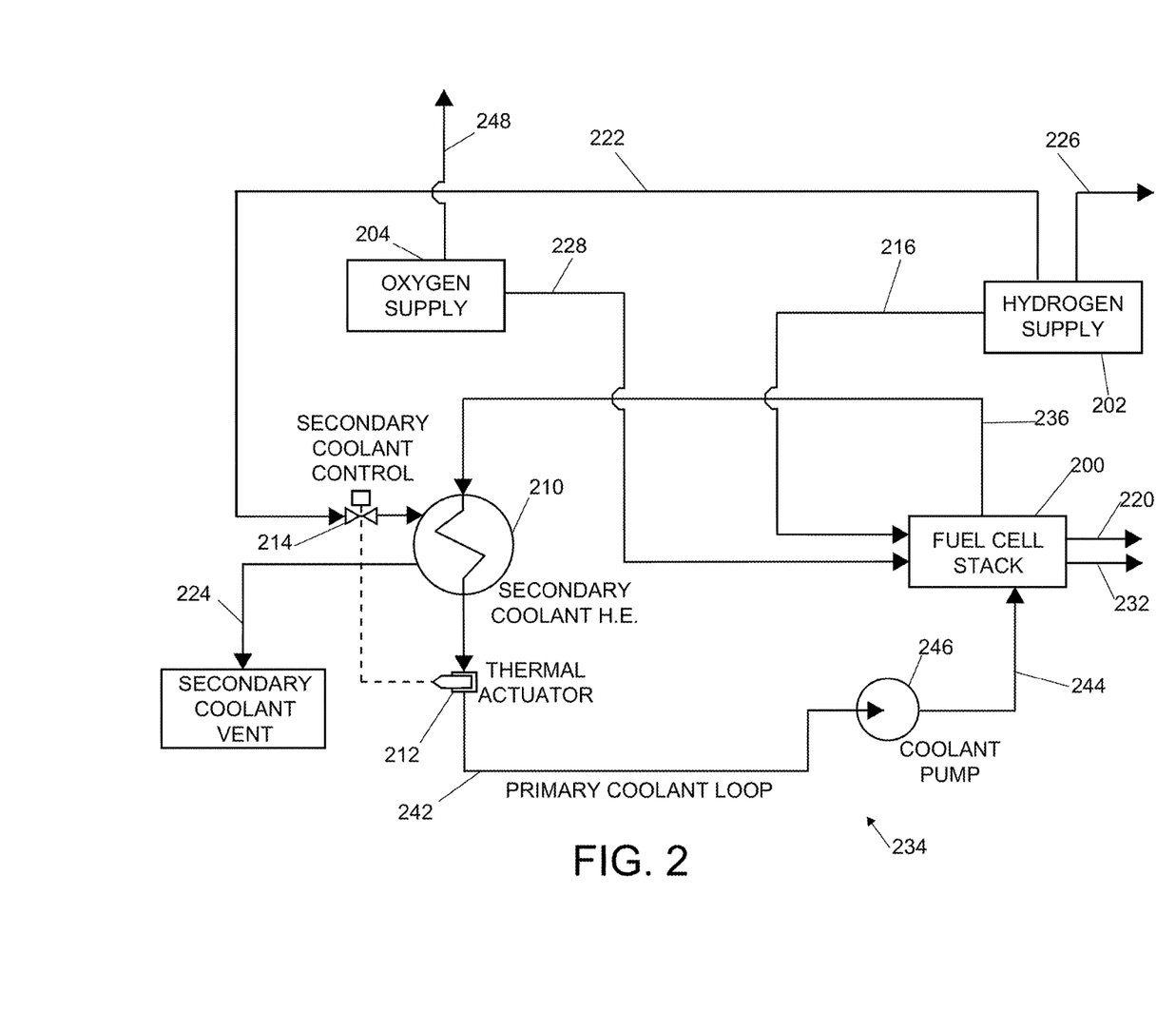
FIG. 2 is a schematic flow diagram illustrating a fuel cell system having one heat exchanger.

Referring to FIG. 2, a fuel cell system is shown, similar to the fuel cell system shown in FIG. 1, but without the oxygen and hydrogen heat exchangers in feed lines to the fuel cell stack. The fuel cell system may comprise a fuel cell stack 200 and a coolant loop 234. The fuel cell stack 200 may comprise a plurality of individual fuel cells and can be configured to provide a specified electrical output, for example, to meet the specific electrical needs of a desired application. The fuel cell stack 200 may be in fluid communication with a hydrogen supply 202 and an oxygen supply 204. The hydrogen supply 202 and the oxygen supply 204 may comprise pressurized tanks that are cryogenically cooled to temperatures below the boiling point of molecular hydrogen gas and molecular oxygen gas (e.g., below about 20 K for hydrogen and about 90 K for oxygen). The cryogenic liquids stored in the hydrogen supply 202 and the oxygen supply 204 may boil-off to gaseous hydrogen and oxygen, respectively, which are fed to the fuel cell stack 200 to react and produce electricity, heat, and water. With the extremely cold temperatures of the cryogenically cooled hydrogen supply 202, hydrogen feed may be used in a heat exchanger to remove thermal energy from the coolant fluid in the coolant loop 234.

The fuel cell system further comprises a heat exchanger 210. The heat exchanger 210 may be configured to provide sufficient heat transfer between the various components of the fuel cell system. In one embodiment, the heat exchanger 210 may comprise a shell and tube heat exchanger. In another embodiment, the heat exchanger 210 may comprise a flat plate heat exchanger.

The cryogenically cooled hydrogen supply 202 may boil-off over time. This boil-off of hydrogen gas could cause the hydrogen supply 202, for example, implemented as cryogenic storage tanks, to build excess pressure. To avoid over pressuring the storage tanks, a portion of the hydrogen supply 202 must be vented. The boiled-off hydrogen may be removed from the storage tanks though a hydrogen vent 226 or used as an inlet supply for the fuel cell system through a hydrogen supply line 216. The hydrogen supply 202 may provide fuel to the fuel cell stack 200. The boiled-off hydrogen may exit the hydrogen supply 202 through the hydrogen supply line 216 and flow to the fuel cell stack 200. The coolant fluid exits the fuel cell stack 200 through a coolant outlet line 236 and flows to the secondary coolant heat exchanger 210. The unreacted hydrogen exits the fuel cell stack 200 through the hydrogen exit line 220 and is either recycled back into the fuel cell stack 200 (not shown) or vented or otherwise processed.

An oxygen supply line 228 is configured to supply oxygen to the fuel cell stack 200. The unreacted oxygen exits the fuel cell stack 200 through the oxygen exit line 232 and is either recycled back into the fuel cell stack 200 (not shown) or vented or otherwise processed. To avoid over pressuring the storage tanks, a portion of the oxygen supply 204 must be vented. The boiled-off oxygen may be removed from the storage tanks though an oxygen vent 248.

The fuel cell stack 200 generates electricity and heat from the electrochemical reaction between the hydrogen and oxygen feeds. The coolant loop 234 facilitates the removal of the excess heat generated in the exothermic reaction within the fuel cell stack 200. The fuel cell stack 200 is constructed to maintain separation of the coolant fluid from the reactants, products, and electrolyte material in the fuel cell stack. The coolant loop 234 may pass through the fuel cell stack 200 using suitable heat exchange equipment, such as, for example, a manifold or interface heat exchanger that holds cooling plates located adjacent to the electrodes, which transport the excess heat from the electrodes to the coolant fluid circulating through the manifold or interface heat exchanger. In one example, pyrolytic graphite cooling plates (optionally coated with metallic paint, e.g., silver paint) or planar titanium heat pipe cooling plates are located adjacent to the electrodes in a fuel cell stack. The edges of the cooling plates extend beyond the fuel cell stack and are positioned within slots located in a manifold through which the coolant fluid flows. Alternatively, the edges of the coolant plates may be located within slots in an interface plate located between the fuel cell stack and an adjacent interface heat exchanger through which the coolant fluid flows.

Other various types of heat exchangers may be utilized to transport heat from the components of the fuel cell stack 200 to the circulating coolant fluid, for example flat plate heat exchangers. The electrochemical reactions occurring in the operating fuel cell stack 200 also produce water. The produced water may be released from the fuel cell stack 200 and disposed of or collected and contained within a storage tank for various uses.

The secondary coolant heat exchanger 210 utilizes a hydrogen bypass line 222 from the hydrogen supply 202. The hydrogen bypass line 222 feeds a portion of the boiled-off hydrogen to the secondary coolant heat exchanger 210 where is operates as a heat sink. The flow of the hydrogen through the secondary heat exchanger 210 is controlled through a secondary coolant control valve 214 and a thermal actuator 212. The thermal actuator 212 may be placed downstream of the secondary coolant heat exchanger 210. The thermal actuator 212 controls the opening and closing of the secondary coolant control valve 214 based on the temperature of the coolant fluid in the supply line exiting the secondary coolant heat exchanger 210. In one embodiment, described below in connection with FIGS. 5 and 6, the thermal actuator 212 may comprise a passive thermal actuator in physical contact with the coolant fluid in coolant line 242, in which the passive thermal actuator 212 mechanically operates the secondary coolant control valve 214 based on the temperature of the coolant fluid in the coolant line 242 and actuates the flow of hydrogen into the secondary coolant heat exchanger 210 through the secondary coolant control valve 214. Upon exiting the secondary coolant heat exchanger 210, the hydrogen flows through line 224 and is vented through the hydrogen secondary coolant vent.

In other embodiments, the thermal actuator 212 may be replaced with a temperature sensor and a feedback controller that controls the opening and closing of the secondary coolant control valve 214 to control the temperature of the coolant within the coolant loop. Various types of controllers are envisioned and may be utilized with the fuel cell system.

In addition to the hydrogen bypass line 222 and the hydrogen supply line 216 in fluid communication with the hydrogen supply 202, a primary hydrogen vent line 226 may also be present to vent excess hydrogen boiled-off from the hydrogen supply 202. When the boiled-off hydrogen gas exceeds the requirements for the fuel cell stack 200 and the secondary coolant heat exchanger 210, the hydrogen vent line 226 may permit the release of the excess boiled-off hydrogen to prevent the cryogenically cooled hydrogen supply tank from over pressuring. Although hydrogen lines 216, 222, and 226 are shown as separate outlet lines from the hydrogen supply 202, it is understood that the lines can be implemented as branches from a single outlet line using suitable T-joints or Y-joints in the fluid conduits.

The coolant within the coolant loop 234 may be chosen for its particular heat transfer properties. For example, the coolant may comprise water, ethylene glycol, propylene glycol, methanol, or ethanol, or combinations of any thereof. Other fluids may also be selected for use within the coolant loop 134 having suitable heat transfer properties.

The temperature of the coolant fluid within the coolant loop 234 has its highest temperature exiting the fuel cell stack 200 in the coolant supply line 236 to the secondary heat exchanger 210. As the coolant fluid flows through the coolant loop 234, thermal energy in the coolant fluid is transferred through the secondary heat exchanger 210. When the coolant fluid reaches the coolant fluid inlet line 244 to the fuel cell stack 200, the temperature of the coolant fluid is at its lowest point which facilitates the removal of the excess thermal energy produced in the fuel cell stack 200. From the secondary coolant heat exchanger 210, the coolant fluid enters a coolant line 242 that leads to the coolant pump 246, which circulates the coolant fluid within the coolant loop 234. The coolant pump 246 may be powered through gas pressure, electrical power, or other means to facilitate the circulation of the coolant fluid through the coolant loop 234.

Figure 3:
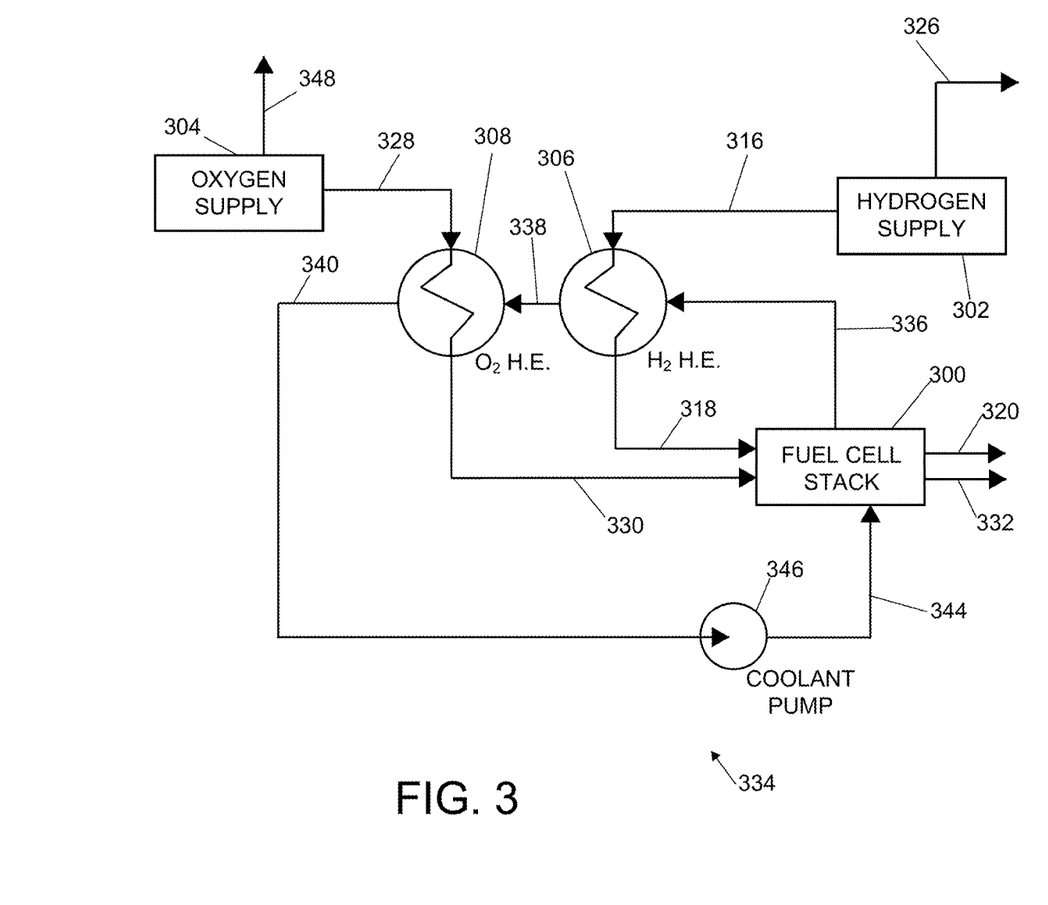
FIG. 3 is a schematic flow diagram illustrating a fuel cell system having two heat exchangers.

Referring to FIG. 3, a fuel cell system is shown, similar to the fuel cell system shown in FIG. 1, but without the secondary coolant heat exchanger in the coolant loop. The fuel cell system comprises a fuel cell stack 300 and a coolant loop 334. The fuel cell stack 300 may comprise a plurality of individual fuel cells and can be configured to provide a specified electrical output, for example, to meet the specific electrical needs of a desired application. The fuel cell stack 300 may be in fluid communication with a hydrogen supply 302 and an oxygen supply 304. The hydrogen supply 302 and the oxygen supply 304 may comprise pressurized tanks that are cryogenically cooled to temperatures below the boiling point of molecular hydrogen gas and molecular oxygen gas (e.g., below about 20 K for hydrogen and about 90 K for oxygen). The cryogenic liquids stored in the hydrogen supply 302 and the oxygen supply 304 may boil-off to gaseous hydrogen and oxygen, respectively, which are fed to the fuel cell stack 300 to react and produce electricity, heat, and water. With the extremely cold temperatures of the cryogenically cooled hydrogen supply 302 and the oxygen supply 304, the oxygen and hydrogen feeds to the fuel cell stack 300 may be used in heat exchangers to remove thermal energy from the coolant fluid in the coolant loop 334.

The fuel cell system further comprises heat exchangers 306 and 308. The heat exchangers may be configured to provide sufficient heat transfer between the various components of the fuel cell system. In one embodiment, the heat exchangers may comprise shell and tube heat exchangers. In another embodiment, the heat exchangers may comprise flat plate heat exchangers.

The cryogenically cooled hydrogen supply 302 may boil-off over time. This boil-off of hydrogen gas could cause the hydrogen supply 302, for example, implemented as cryogenic storage tanks, to build excess pressure. To avoid over pressuring the storage tanks, a portion of the hydrogen supply 302 must be vented. The boiled-off hydrogen may be removed from the storage tanks though a hydrogen vent 326 or used as an inlet supply for the fuel cell system through a hydrogen supply line 316. The hydrogen supply 302 may provide fuel to the fuel cell stack 300. The boiled-off hydrogen may exit the hydrogen supply 302 through the hydrogen supply line 316. The hydrogen supply line 316 may pass through a hydrogen heat exchanger 306 and operate as a heat sink to transfer energy from the coolant fluid exiting the fuel cell stack 300. The coolant fluid exits the fuel cell stack 300 through a coolant outlet line 336, which provides the fluid communication between the fuel cell stack 300 and the hydrogen heat exchanger 306. The hydrogen exits the hydrogen heat exchanger 306 and is fed through a hydrogen supply line 318 to the fuel cell stack 300. The unreacted hydrogen exits the fuel cell stack 300 through the hydrogen exit line 320 and is either recycled back into the fuel cell stack 100 (not shown) or vented or otherwise processed.

Similarly, an oxygen supply line 328 transports boiled-off oxygen from the oxygen supply 304 to the oxygen heat exchanger 308, where the oxygen fluid absorbs thermal energy from the coolant fluid in the coolant loop 334. The oxygen supply line 328 provides fluid communication between the oxygen supply 304 and the oxygen heat exchanger 308. In the oxygen heat exchanger 308, the oxygen fluid acts as a heat sink to absorb thermal energy from the coolant fluid. Upon exiting the oxygen heat exchanger 308, the oxygen is fed through the oxygen supply line 330 to the fuel cell stack 300. The unreacted oxygen exits the fuel cell stack 300 through the oxygen exit line 332 and is either recycled back into the fuel cell stack 300 (not shown) or vented or otherwise processed. To avoid over pressuring the storage tanks, a portion of the oxygen supply 304 must be vented. The boiled-off oxygen may be removed from the storage tanks though an oxygen vent 348

The fuel cell stack 300 generates electricity and heat from the electrochemical reaction between the hydrogen and oxygen feeds. The coolant loop 334 facilitates the removal of the excess heat generated in the exothermic reaction within the fuel cell stack 300. The fuel cell stack 300 is constructed to maintain separation of the coolant fluid from the reactants, products, and electrolyte material in the fuel cell stack. The coolant loop 334 may pass through the fuel cell stack 300 using suitable heat exchange equipment, such as, for example, a manifold or interface heat exchanger that holds cooling plates located adjacent to the electrodes, which transport the excess heat from the electrodes to the coolant fluid circulating through the manifold or interface heat exchanger. In one example, pyrolytic graphite cooling plates (optionally coated with metallic paint, e.g., silver paint) or planar titanium heat pipe cooling plates are located adjacent to the electrodes in a fuel cell stack. The edges of the cooling plates extend beyond the fuel cell stack and are positioned within slots located in a manifold through which the coolant fluid flows. Alternatively, the edges of the coolant plates may be located within slots in an interface plate located between the fuel cell stack and an adjacent interface heat exchanger through which the coolant fluid flows.

Other various types of heat exchangers may be utilized to transport heat from the components of the fuel cell stack 300 to the circulating coolant fluid, for example flat plate heat exchangers. The electrochemical reactions occurring in the operating fuel cell stack 300 also produce water. The produced water may be released from the fuel cell stack 300 and disposed of or collected and contained within a storage tank for various uses.

In addition to the hydrogen supply line 316 in fluid communication with the hydrogen supply 302, a primary hydrogen vent line 326 may also be present to vent excess hydrogen boiled-off from the hydrogen supply 302. When the boiled-off hydrogen gas exceeds the requirements for the fuel cell stack 300, the hydrogen vent line 326 may permit the release of the excess boiled-off hydrogen to prevent the cryogenically cooled hydrogen supply tank from over pressuring. Although hydrogen lines 316 and 326 are shown as separate outlet lines from the hydrogen supply 302, it is understood that the lines can be implemented as branches from a single outlet line using suitable T-joints or Y-joints in the fluid conduits.

The coolant within the coolant loop 334 may be chosen for its particular heat transfer properties. For example, the coolant may comprise water, ethylene glycol, propylene glycol, methanol, or ethanol, or combinations of any thereof. Other fluids may also be selected for use within the coolant loop 334 having suitable heat transfer properties.

The temperature of the coolant fluid within the coolant loop 334 has its highest temperature exiting the fuel cell stack 300 in the coolant supply line 336 to the hydrogen heat exchanger 306. As the coolant fluid flows through the coolant loop 334, thermal energy in the coolant fluid is transferred through the heat exchangers 306 and 308. When the coolant fluid reaches the coolant fluid inlet line 344 to the fuel cell stack 300, the temperature of the coolant fluid is at its lowest point, which facilitates the removal of the excess thermal energy produced in the fuel cell stack 300. The coolant fluid exits the hydrogen heat exchanger 306 through the coolant line 338 to the oxygen heat exchanger 308. From the oxygen heat exchanger 308, the coolant fluid flows through a coolant line 340 that leads to the coolant pump 346, which circulates the coolant fluid within the coolant loop 334. The coolant pump 346 may be powered through gas pressure, electrical power, or other means to facilitate the circulation of the coolant fluid through the coolant loop 334.

Figure 4:
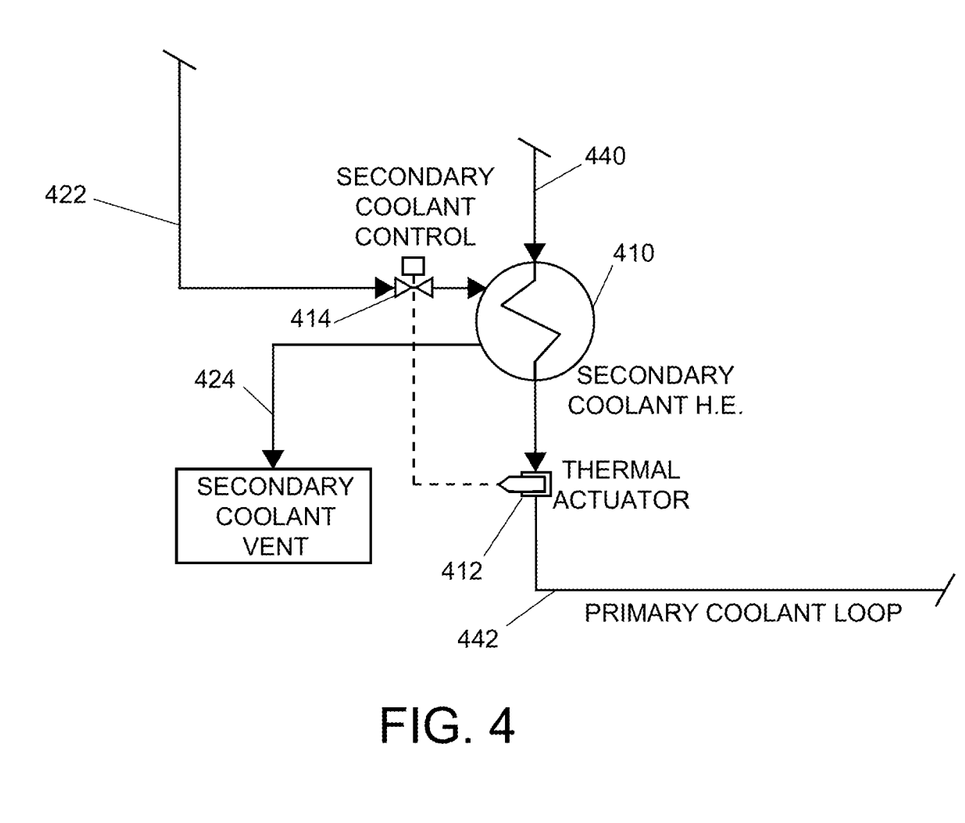
FIG. 4 is a schematic flow diagram illustrating a secondary coolant heat exchanger.

Referring to FIG. 4, a secondary coolant heat exchanger 410 is shown, similar to the secondary coolant heat exchangers shown in FIGS. 1 and 2. The secondary coolant heat exchanger 410 may be configured to provide sufficient heat transfer between the various components of a fuel cell system or other system that requires thermal control. In one embodiment, the secondary coolant heat exchanger 410 may comprise a shell and tube heat exchanger. In another embodiment, the secondary coolant heat exchanger 410 may comprise a flat plate heat exchanger.

The secondary coolant heat exchanger 410 may be configured to transfer thermal energy between a primary coolant fluid flowing though line 440 and a secondary coolant fluid at a lower temperature flowing through line 442. In one embodiment, the primary coolant fluid may comprise water, ethylene glycol, propylene glycol, methanol, or ethanol, or combinations of any thereof. Other fluids may also be selected for use as a primary coolant fluid having suitable heat transfer properties. The secondary coolant fluid may comprise a reactive process fluid such as, for example, a fuel or oxidant fluid.

The secondary coolant heat exchanger 410 may use a stream from a cryogenically cooled fuel (e.g., hydrogen) supply, or a cryogenically cooled oxidant (e.g., oxygen) supply, as the secondary coolant fluid functioning as a heat sink to remove thermal energy from the primary coolant fluid. In one embodiment, a fuel or oxidant (e.g., hydrogen or oxygen) line 422 may be used with the secondary coolant heat exchanger 410 to cool the primary coolant fluid flowing through line 440. To control the temperature of the primary coolant fluid exiting the secondary coolant heat exchanger 410 through a coolant fluid exit line 442, a thermal actuator 412 may be placed in the coolant fluid exit line 442. The thermal actuator 410 may comprise a passive thermal actuator, which is described below in connection with FIGS. 5 and 6. The passive thermal actuator 412 is in physical contact with the primary coolant fluid in coolant line 442. The passive thermal actuator 412 mechanically operates the secondary coolant control valve 414 based on the temperature of the primary coolant fluid in the coolant line 442 and actuates the flow of secondary coolant fluid into the secondary coolant heat exchanger 410 through the secondary coolant control valve 414. After the secondary coolant fluid (e.g., hydrogen or another fuel) passes through the secondary coolant heat exchanger 410, the secondary coolant fluid flows through line 424 and is vented through the secondary coolant vent.

In various embodiments, the operating parameters and materials of construction of the thermal actuator 412 and secondary coolant control valve 414 must be selected to withstand a range of thermal conditions, such as cryogenic conditions, for example. In some embodiments, the secondary coolant control valve 414 must be thermally isolated from the thermal actuator 412 to prevent the freeze-up or lock-up of the thermal actuator 412 resulting from cryogenic temperatures of the secondary coolant fluid. In various embodiments, the temperature of the primary coolant fluid in the line 442 exiting the secondary coolant heat exchanger 410 will be selected to fall within the desired operating parameter of a fuel cell system. In one embodiment, the coolant temperature may be controlled to fall within 330 K and 360 K. The secondary coolant fluid may be liquid or gaseous in various embodiments.

In other embodiments, the thermal actuator 412 may be replaced with a temperature sensor and a feedback controller that controls the opening and closing of the secondary coolant control valve 414 to control the temperature of the primary coolant fluid flowing through the secondary coolant heat exchanger 410. Various types of controllers are envisioned and may be utilized with the system.

Figure 5:
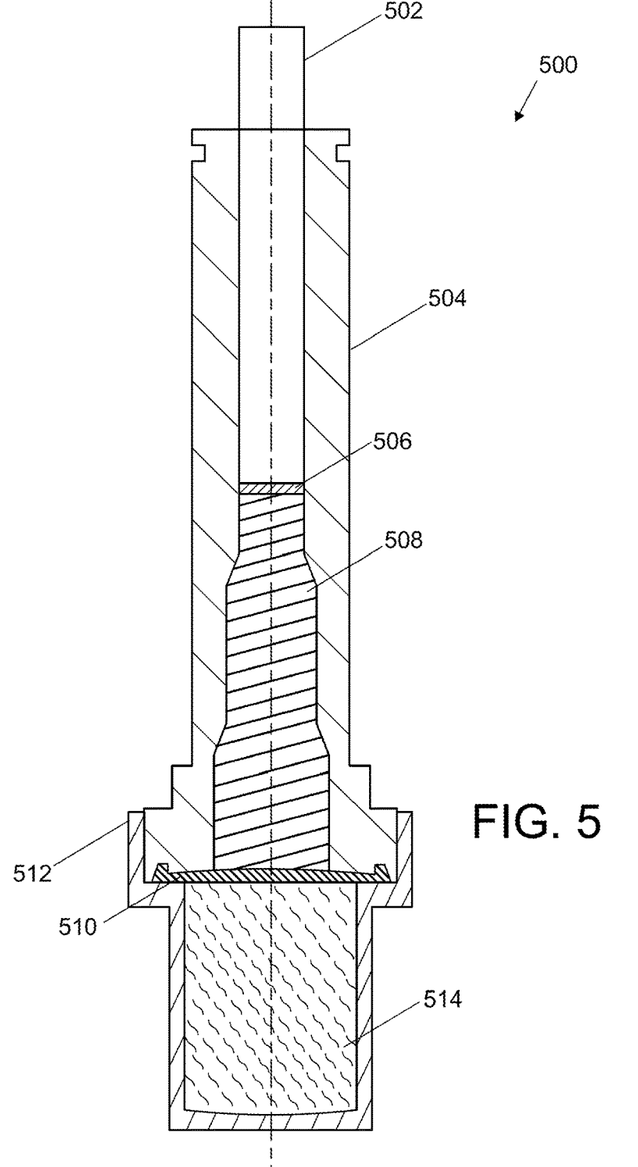
FIG. 5 is a cross-sectional schematic diagram illustrating a thermal actuator.
Figure 6:
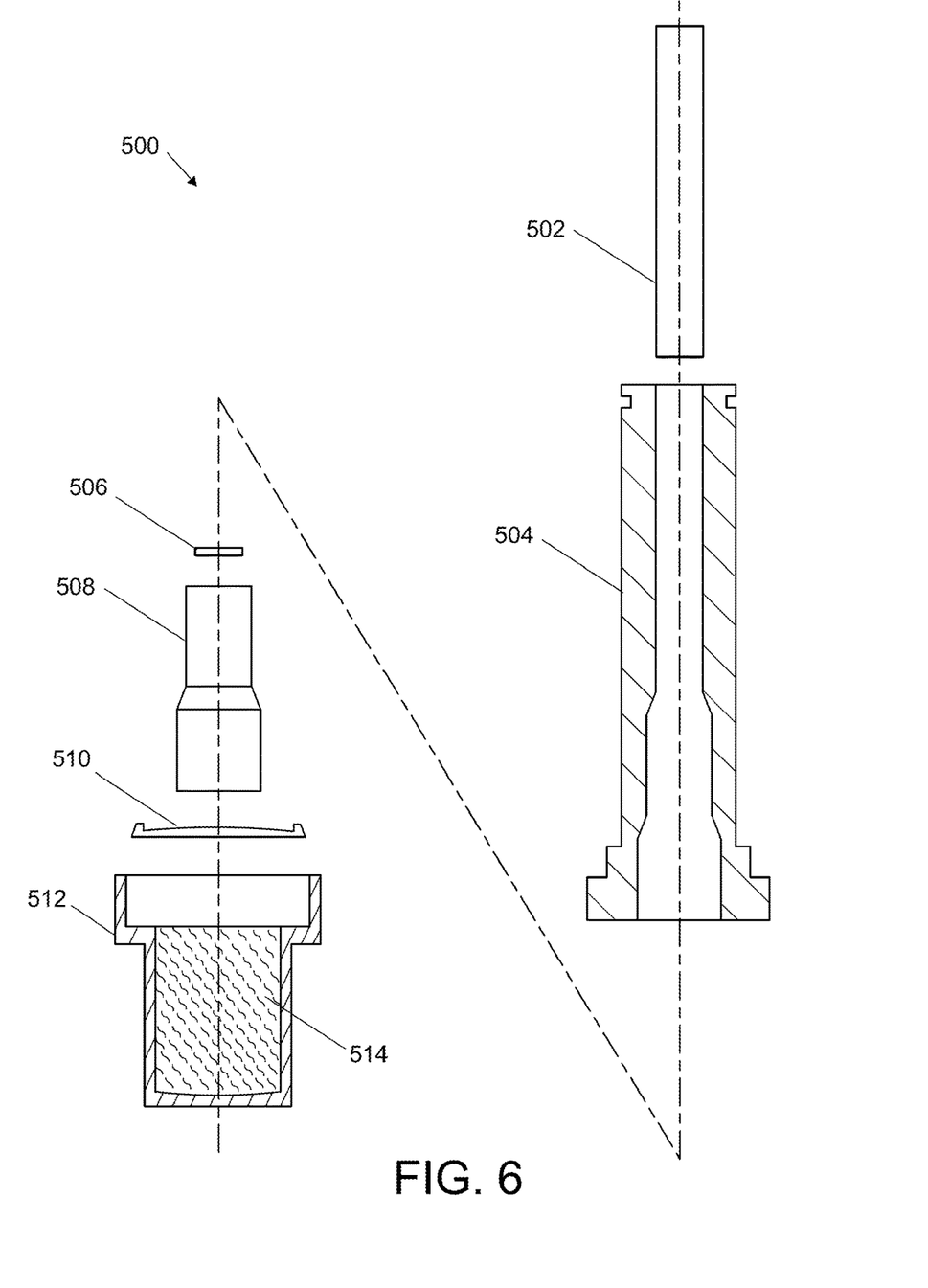
FIG. 6 is an exploded view of the schematic diagram shown in FIG. 5.

FIGS. 5 and 6 depicts a thermal actuator 500, which may be used as the thermal actuator 112, 212, and 412 shown in FIGS. 1, 2, and 4, respectively. The thermal actuator 500 may be configured to operate within desired parameters. The thermal actuator may operate to extend a piston 502 upon a temperature increase without the need for any external power source or electronic control hardware or software. In one embodiment, the thermal actuator 500 may be configured to operate within a temperature range of 270 K to 420 K. Other design specifications of the thermal actuator 500 may include a working stroke between 0.050-0.450 inches and a maximum stroke of 0.500 inches. In other embodiments, the thermal actuator 500 may be configured for a max load of 50 pounds-force and a minimum return load of 20 pound force. In addition, the various material properties of the thermal actuator 500 may be selected based upon the operating conditions of the system in which the thermal actuator is employed.

In one embodiment, the thermal actuator comprises piston 502, guide cylinder 504, disc 506, plug 508, diaphragm 510, cup 512, and pellet 514. These components function to provide the desired operating characteristics of the thermal actuator 500. In one embodiment, the piston 502 may be configured to prevent the thermal actuator 500 from freezing when in contact with various constituents of a fuel cell system. The guide cylinder 504 may be configured to receive the piston 502 and to achieve a desired mechanical advantage during a piston stroke. The disc 506 may be configured to provide separation between the piston 502 and the plug 508 and to provide for smooth mechanical actuation of the piston 502 as the plug 508 is force upwardly into the cylinder 504. The plug 508 may be configured to be forced within the guide cylinder 504 to achieve a desired mechanical advantage of the thermal actuator 500. The diaphragm 510, the cup 512 and the pellet 514 may be configured to provide the stroke of the thermal actuator 500 in response to changes in temperatures. As the temperate increases, the pellet 514 within the cup 512 expands, which causes displacement of the diaphragm 510. The displacement of the diaphragm 510 forces the plug 508 upwardly into guide cylinder 504, which in turn displaces the piston 502 along the designed stroke of the thermal actuator. The piston 502 may be mechanically engaged with a valve, such as valves 114, 214, and 414 in FIGS. 1, 2, and 4, respectively, and the displacement of the piston 502 into and out of the guide cylinder with decreases and increases in temperature may be used to drive the closing and opening of the valve.

Figure 7:
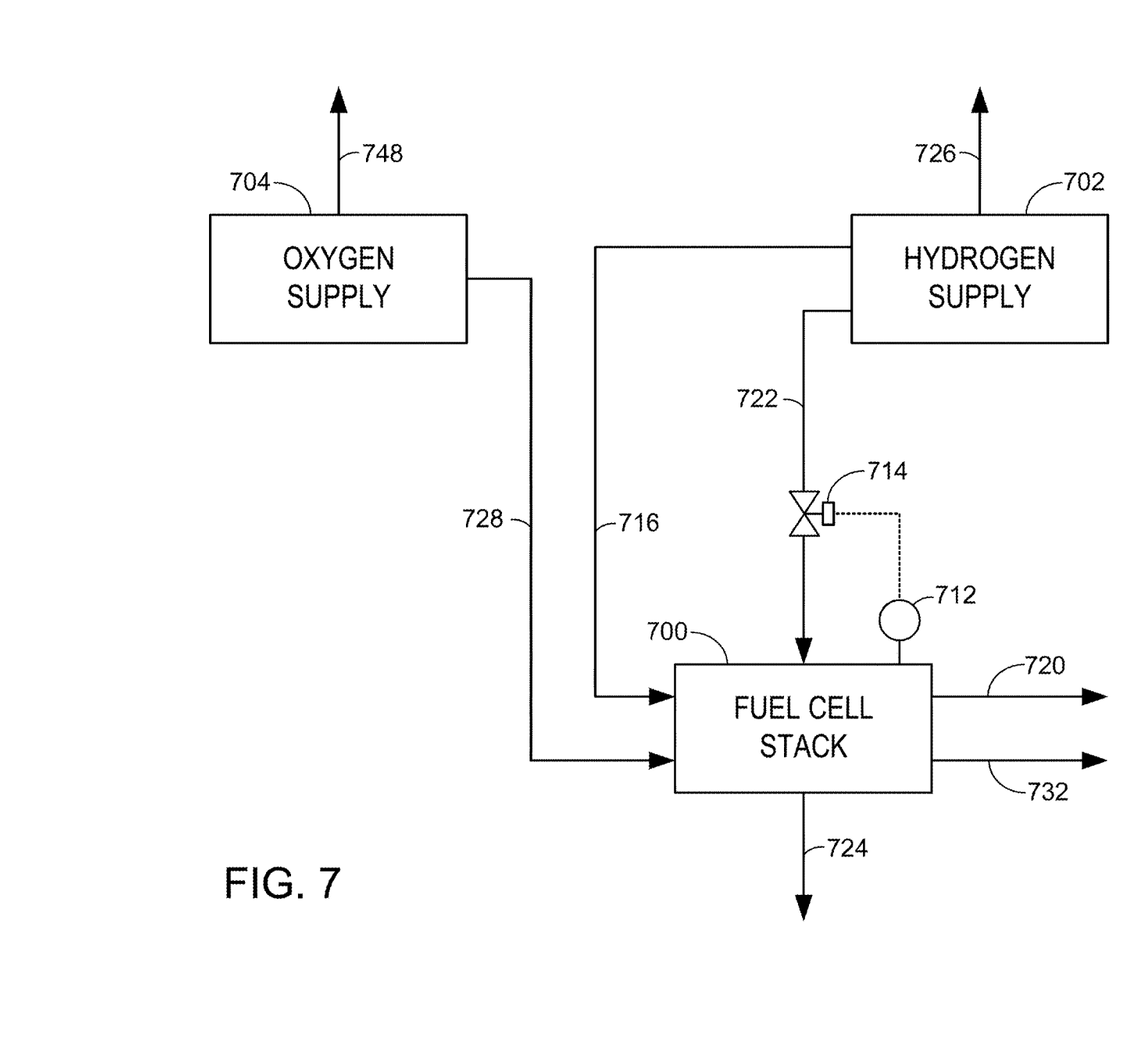
FIG. 7 is a schematic flow diagram illustrating a fuel cell system without a coolant loop and external heat exchangers in which the fuel is fed to the fuel cell through a reactant line and a separate coolant line.

Referring to FIG. 7, a fuel cell system comprises a fuel cell stack 700 in fluid communication with a hydrogen supply 702 and an oxygen supply 704 through a hydrogen supply line 728 and an oxygen supply line 716. The hydrogen supply 702 and the oxygen supply 704 may comprise pressurized tanks that are cryogenically cooled to temperatures below the boiling point of molecular hydrogen gas and molecular oxygen gas (e.g., below about 20 K for hydrogen and about 90 K for oxygen, but generally below 100 K for either). The cryogenic liquids stored in the hydrogen supply 702 and the oxygen supply 704 may boil-off to gaseous hydrogen and oxygen, respectively, which are fed to the fuel cell stack 700 through supply lines 716 and 728 to react and produce electricity, heat, and water.

The cryogenically cooled hydrogen supply 702 may boil-off over time. This boil-off of hydrogen gas could cause the hydrogen supply 702, for example, implemented as cryogenic storage tanks or other vessels, to build excess pressure. To avoid over pressuring the storage tanks, a portion of the hydrogen supply 702 must be vented. The boiled-off hydrogen may be removed from the storage tanks though a hydrogen vent 726 and the hydrogen supply line 716 and fed to the fuel cell stack 700. Any unreacted hydrogen exits the fuel cell stack 700 through the hydrogen exit line 720 and is either recycled back into the fuel cell stack 700 (not shown) or vented or otherwise processed.

An oxygen supply line 728 transports boiled-off oxygen from the oxygen supply 704 to the fuel cell stack 700. Any unreacted oxygen exits the fuel cell stack 700 through the oxygen exit line 732 and is either recycled back into the fuel cell stack 700 (not shown) or vented or otherwise processed. To avoid over pressuring the storage tanks, a portion of the oxygen supply 704 must be vented. The boiled-off oxygen may be removed from the storage tanks though an oxygen vent 748

The fuel cell system comprises a hydrogen bypass line 722 in fluid communication with the hydrogen supply 702 and the fuel cell stack 700. The hydrogen bypass line 722 feeds a portion of the boiled-off hydrogen to the fuel cell stack 700 through suitable heat exchange equipment, such as, for example, a manifold or interface heat exchanger that holds cooling plates located adjacent to the electrodes in the fuel cell stack. The cooling plates transport the excess heat from the electrodes in the fuel cell stack to the hydrogen "coolant" fluid in the manifold or interface heat exchanger.

In one example, pyrolytic graphite cooling plates (optionally coated with metallic paint, e.g., silver paint) or planar titanium heat pipe cooling plates are located adjacent to the electrodes in a fuel cell stack 700. The edges of the cooling plates extend beyond the fuel cell stack 700 and are positioned within slots located in a manifold (not shown) which contains the hydrogen "coolant" fluid. Alternatively, the edges of the coolant plates may be located within slots in an interface plate (not shown) located between the fuel cell stack 700 and an adjacent interface heat exchanger (not shown) through which contains the hydrogen "coolant" fluid.

The hydrogen "coolant" fluid flowing from the hydrogen supply 702, through the hydrogen bypass line 722, and through the fuel cell stack 700, operates as a heat sink for the fuel cell stack 700. The flow of the hydrogen through the hydrogen bypass line 722 and through the heat exchange path of the fuel cell stack 700 is controlled through a control valve 714 and a sensor 712. The sensor 712 is in thermal contact with and measures the operating temperature of the fuel cell stack 700. The sensor 712 controls the opening and closing of the control valve 714 based on the measured operating temperature of fuel cell. In one example, as described above in connection with FIGS. 5 and 6, the sensor 712 may comprise a passive thermal actuator in thermal contact with the fuel cell, in which the passive thermal actuator 712 mechanically operates the control valve 714 based on the operating temperature of the fuel cell and actuates the flow of hydrogen through the heat exchange equipment (not shown) interfacing with the fuel cell stack 700. Upon exiting the fuel cell stack 700, the hydrogen coolant fed from the bypass line 722 flows through an outlet line 724 and is vented or otherwise processed.

In other embodiments, the sensor 712 may comprise a temperature sensor and the system further comprises a feedback controller that controls the opening and closing of the control valve 714 to control the temperature of the fuel cell stack.

In addition to the hydrogen bypass line 722 and the hydrogen supply line 716 in fluid communication with the hydrogen supply 702, a primary hydrogen vent line 726 may also be present to vent excess boiled-off hydrogen from the hydrogen supply 702. When the boiled-off hydrogen gas exceeds the reactant and coolant requirements for the fuel cell stack 700, the hydrogen vent line 726 may permit the release of the excess boiled-off hydrogen, for example, to prevent the cryogenically cooled hydrogen supply tank from over pressuring. Although hydrogen lines 716, 722, and 726 are shown as separate outlet lines from the hydrogen supply 702, it is understood that the lines can be implemented as branches from a single outlet line using suitable T-joints or Y-joints in the fluid conduits.

Figure 8:
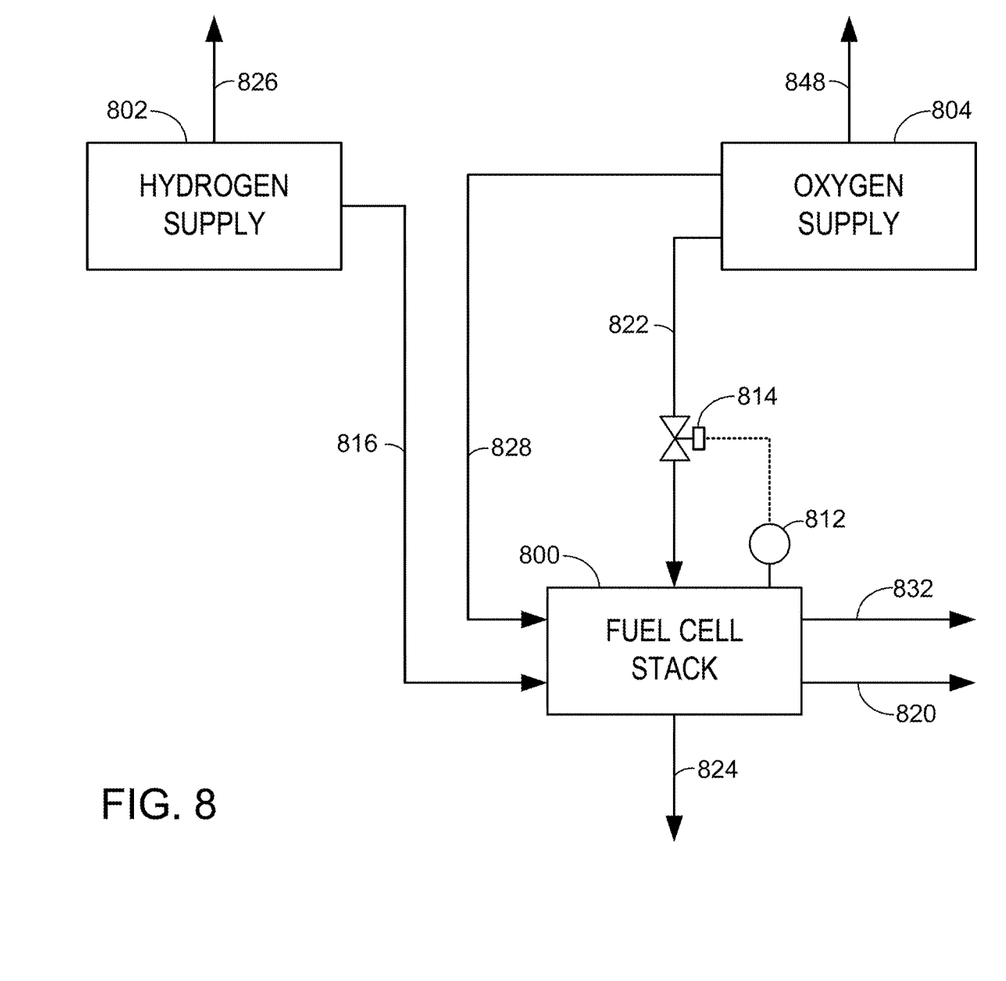
FIG. 8 is a schematic flow diagram illustrating a fuel cell system without a coolant loop and external heat exchangers in which the oxidant is fed to the fuel cell through a reactant line and a separate coolant line.

Referring to FIG. 8, a fuel cell system comprises a fuel cell stack 800 in fluid communication with a hydrogen supply 802 and an oxygen supply 804 through a hydrogen supply line 816 and an oxygen supply line 828. The hydrogen supply 802 and the oxygen supply 804 may comprise pressurized tanks that are cryogenically cooled to temperatures below the boiling point of molecular hydrogen gas and molecular oxygen gas (e.g., below about 20 K for hydrogen and about 90 K for oxygen, but generally below 100 K for either). The cryogenic liquids stored in the hydrogen supply 802 and the oxygen supply 804 may boil-off to gaseous hydrogen and oxygen, respectively, which are fed to the fuel cell stack 800 through supply lines 816 and 828 to react and produce electricity, heat, and water.

The cryogenically cooled hydrogen supply 802 may boil-off over time. This boil-off of hydrogen gas could cause the hydrogen supply 802, for example, implemented as cryogenic storage tanks or other vessels, to build excess pressure. To avoid over pressuring the storage tanks, a portion of the hydrogen supply 802 must be vented. The boiled-off hydrogen may be removed from the storage tanks though a hydrogen vent 826 and the hydrogen supply line 816 and fed to the fuel cell stack 800. Any unreacted hydrogen exits the fuel cell stack 800 through the hydrogen exit line 820 and is either recycled back into the fuel cell stack 800 (not shown) or vented or otherwise processed.

An oxygen supply line 828 transports boiled-off oxygen from the oxygen supply 804 to the fuel cell stack 800. Any unreacted oxygen exits the fuel cell stack 800 through the oxygen exit line 832 and is either recycled back into the fuel cell stack 800 (not shown) or vented or otherwise processed.

The fuel cell system comprises an oxygen bypass line 822 in fluid communication with the oxygen supply 802 and the fuel cell stack 800. The oxygen bypass line 822 feeds a portion of the boiled-off oxygen to the fuel cell stack 800 through suitable heat exchange equipment, such as, for example, a manifold or interface heat exchanger that holds cooling plates located adjacent to the electrodes in the fuel cell stack. The cooling plates transport the excess heat from the electrodes in the fuel cell stack to the hydrogen "coolant" fluid in the manifold or interface heat exchanger.

In one example, pyrolytic graphite cooling plates (optionally coated with metallic paint, e.g., silver paint) or planar titanium heat pipe cooling plates are located adjacent to the electrodes in a fuel cell stack 800. The edges of the cooling plates extend beyond the fuel cell stack 800 and are positioned within slots located in a manifold (not shown) which contains the hydrogen "coolant" fluid. Alternatively, the edges of the coolant plates may be located within slots in an interface plate (not shown) located between the fuel cell stack 800 and an adjacent interface heat exchanger (not shown) through which contains the hydrogen "coolant" fluid.

The oxygen "coolant" fluid flowing from the oxygen supply 802, through the oxygen bypass line 822, and through the fuel cell stack 800, operates as a heat sink for the fuel cell stack 800. The flow of the oxygen through the oxygen bypass line 822 and through the heat exchange path of the fuel cell stack 800 is controlled through a control valve 814 and a sensor 812. The sensor 812 is in thermal contact with and measures the operating temperature of the fuel cell stack 800. The sensor 812 controls the opening and closing of the control valve 814 based on the measured operating temperature of fuel cell. In one example, as described above in connection with FIGS. 5 and 6, the sensor 812 may comprise a passive thermal actuator in thermal contact with the fuel cell, in which the passive thermal actuator 812 mechanically operates the control valve 814 based on the operating temperature of the fuel cell and actuates the flow of oxygen through the heat exchange equipment (not shown) interfacing with the fuel cell stack 800. Upon exiting the fuel cell stack 800, the oxygen coolant fed from the bypass line 822 flows through an outlet line 824 and is vented or otherwise processed.

In other embodiments, the sensor 812 may comprise a temperature sensor and the system further comprises a feedback controller that controls the opening and closing of the control valve 814 to control the temperature of the fuel cell stack.

In addition to the oxygen bypass line 822 and the oxygen supply line 816 in fluid communication with the oxygen supply 802, a primary oxygen vent line 848 may also be present to vent excess boiled-off oxygen from the oxygen supply 802. When the boiled-off oxygen gas exceeds the reactant and coolant requirements for the fuel cell stack 800, the oxygen vent line 848 may permit the release of the excess boiled-off oxygen, for example, to prevent the cryogenically cooled oxygen supply tank from over pressuring. Although oxygen lines 816, 822, and 848 are shown as separate outlet lines from the oxygen supply 802, it is understood that the lines can be implemented as branches from a single outlet line using suitable T-joints or Y-joints in the fluid conduits.

Various features and characteristics of the invention are described in this specification and illustrated in the drawings to provide an overall understanding of the disclosed systems and methods. It is understood that the various features and characteristics described in this specification and illustrated in the drawings can be combined in any suitable manner regardless of whether such features and characteristics are expressly described or illustrated in combination in this specification. The Inventors and the Applicant expressly intend such combinations of features and characteristics to be included within the scope of this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements (e.g., 35 U.S.C. § 112(a) and Article 123(2) EPC). The systems and methods described in this specification can comprise, consist of, or consist essentially of the various features and characteristics described in this specification.

Any patent, publication, or other disclosure material identified in this specification is incorporated by reference into this specification in its entirety unless otherwise indicated, but only to the extent that the incorporated material does not conflict with existing descriptions, definitions, statements, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference.

The grammatical articles "one", "a", "an", and "the", as used in this specification, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described processes, compositions, and products. Further, the use of a singular noun includes the plural, and the use of a plural noun includes the singular, unless the context of the usage requires otherwise.

What is claimed is:
1. A fuel cell system comprising:
a fuel cell;
a fuel supply in fluid communication with the fuel cell through a fuel supply line;
an oxidant supply in fluid communication with the fuel cell through an oxidant supply line;

a coolant loop in fluid communication with the fuel cell and configured to circulate a coolant fluid through the fuel cell;

a fuel supply line heat exchanger, wherein the coolant loop and the fuel supply line pass through the fuel supply line heat exchanger to transfer heat from the coolant fluid in the coolant loop to fuel fluid in the fuel supply line;

an oxidant supply line heat exchanger, wherein the coolant loop and the oxidant supply line pass through the oxidant supply line heat exchanger to transfer heat from the coolant fluid in the coolant loop to oxidant fluid in the oxidant supply line;

a secondary coolant heat exchanger, wherein the coolant loop and a fuel bypass line in fluid communication with the fuel supply pass through the secondary coolant heat exchanger to transfer heat from the coolant fluid in the coolant loop to fuel fluid in the fuel bypass line;

a control valve located in the fuel bypass line upstream from the secondary coolant heat exchanger; and a thermal actuator located in the coolant loop;

wherein the thermal actuator and the control valve control the flow of fuel through the secondary coolant heat exchanger based on the temperature of the coolant fluid in contact with the thermal actuator.

2. The fuel cell system of claim 1, wherein the fuel supply and the oxidant supply comprise cryogenically cooled liquid storage vessels.

3. The fuel cell system of claim 2, wherein fuel and oxidant stored in the cryogenically cooled liquid storage vessels have a temperature below 100 K.

4. The fuel cell system of claim 2, further comprising a vent line in fluid communication with the storage vessel.

5. The fuel cell system of claim 1, wherein the fuel supply comprises cryogenically cooled hydrogen.

6. The fuel cell system of claim 1, wherein the thermal actuator is a passive thermal actuator in mechanical engagement with the control valve.

7. The fuel cell system of claim 1, wherein the coolant fluid comprises water, ethylene glycol, propylene glycol, methanol, or ethanol, or combinations of any thereof.

8. The fuel cell system of claim 1, wherein an inlet temperature into the fuel cell is between 330 K and 360 K.

9. A fuel cell system comprising:
a fuel cell;
a fuel supply in fluid communication with the fuel cell through a fuel supply line;
an oxidant supply in fluid communication with the fuel cell through an oxidant supply line;
a coolant loop in fluid communication with the fuel cell and configured to circulate a coolant fluid through the fuel cell;
a secondary coolant heat exchanger, wherein the coolant loop and a fuel bypass line in fluid communication with the fuel supply pass through the secondary coolant heat exchanger to transfer heat from the coolant fluid in the coolant loop to fuel fluid in the fuel bypass line;
a control valve located in the fuel bypass line upstream from the secondary coolant heat exchanger; and
a thermal actuator located in the coolant loop;
wherein the thermal actuator and the control valve control the flow of fuel through the secondary coolant heat exchanger based on the temperature of the coolant fluid in contact with the thermal actuator.

10. The fuel cell system of claim 9, wherein the fuel supply and the oxidant supply comprise cryogenically cooled liquid storage vessels.

11. The fuel cell system of claim 10, wherein fuel and oxidant stored in the cryogenically cooled liquid storage vessels have a temperature below 100 K.

12. The fuel cell system of claim 10, further comprising a vent line in fluid communication with the storage vessel.

13. The fuel cell system of claim 9, wherein the fuel supply comprises cryogenically cooled hydrogen.

14. The fuel cell system of claim 9, wherein the thermal actuator is a passive thermal actuator in mechanical engagement with the control valve.

15. The fuel cell system of claim 9, wherein the coolant fluid comprises water, ethylene glycol, propylene glycol, methanol, or ethanol, or combinations of any thereof.

16. The fuel cell system of claim 9, wherein an inlet temperature into the fuel cell is between 330 K and 360 K.

17. The fuel cell system of claim 9, further comprising:
a fuel supply line heat exchanger, wherein the coolant loop and the fuel supply line pass through the fuel supply line heat exchanger to transfer heat from the coolant fluid in the coolant loop to fuel fluid in the fuel supply line; or
an oxidant supply line heat exchanger, wherein the coolant loop and the oxidant supply line pass through the oxidant supply line heat exchanger to transfer heat from the coolant fluid in the coolant loop to oxidant fluid in the oxidant supply line.

18. A fuel cell system comprising:
a fuel cell;
a fuel supply in fluid communication with the fuel cell through a fuel supply line;
an oxidant supply in fluid communication with the fuel cell through an oxidant supply line;
a coolant loop in fluid communication with the fuel cell and configured to circulate a coolant fluid through the fuel cell;
a fuel supply line heat exchanger, wherein the coolant loop and the fuel supply line pass through the fuel supply line heat exchanger to transfer heat from the coolant fluid in the coolant loop to fuel fluid in the fuel supply line; or
an oxidant supply line heat exchanger, wherein the coolant loop and the oxidant supply line pass through the oxidant supply line exchanger to transfer heat from the coolant fluid in the coolant loop to oxidant fluid in the oxidant supply line; and
a secondary coolant heat exchanger, wherein the coolant loop and a fuel bypass line in fluid communication with the fuel supply pass through the secondary coolant heat exchanger to transfer heat from the coolant fluid in the coolant loop to fuel fluid in the fuel bypass line.

19. The fuel cell system of claim 18, wherein the fuel supply and the oxidant supply comprise cryogenically cooled liquid storage vessels.

20. The fuel cell system of claim 18, further comprising:
a control valve located in the fuel bypass line upstream from the secondary coolant heat exchanger; and
a passive thermal actuator located in the coolant loop downstream from the secondary coolant heat exchanger, wherein the passive thermal actuator mechanically engages with the control valve;
wherein the passive thermal actuator and the control valve control the flow of fuel through the secondary coolant heat exchanger based on the temperature of the coolant fluid in contact with the thermal actuator.

21. A fuel cell system comprising:
a fuel cell;

a fuel supply in fluid communication with the fuel cell through a fuel supply line;

an oxidant supply in fluid communication with the fuel cell through an oxidant supply line;

a coolant loop in fluid communication with the fuel cell and configured to circulate a coolant fluid through the fuel cell;

a fuel bypass line in fluid communication with the fuel supply and the fuel cell;

a secondary coolant heat exchanger, wherein the coolant loop and the fuel bypass line in fluid communication with the fuel supply pass through the secondary coolant heat exchanger to transfer heat from the coolant fluid in the coolant loop to fuel fluid in the fuel bypass line;

a control valve located in the fuel bypass line; and a sensor in thermal contact with the fuel cell;

wherein the sensor and the control valve control the flow of fuel through the fuel bypass line based on the operating temperature of the fuel cell.

22. The fuel cell system of claim 21, wherein the fuel supply and the oxidant supply comprise cryogenically cooled liquid storage vessels.

23. The fuel cell system of claim 21, wherein the sensor comprises a passive thermal actuator in mechanical engagement with the control valve.

24. The fuel cell system of claim 1, wherein the secondary coolant heat exchanger further comprises an oxidant bypass line in fluid communication with the oxidant supply, wherein the coolant loop, the fuel bypass line, and the oxidant bypass line pass through the secondary coolant heat exchanger to transfer heat from the coolant fluid in the coolant loop to fuel fluid in the fuel bypass line and to oxidant fluid in the oxidant bypass line.

* * * * *